No. 782,821. Patented February 21, 1905.

UNITED STATES PATENT OFFICE.

JACOB E. BLOOM, OF NEW YORK, N. Y.

PROCESS OF PREPARING OILS FOR EDIBLE OR OTHER PURPOSES.

SPECIFICATION forming part of Letters Patent No. 782,821, dated February 21, 1905.

Application filed March 14, 1904. Serial No. 198,364.

*To all whom it may concern:*

Be it known that I, JACOB E. BLOOM, a citizen of the United States, whose legal residence is in the city of New York, State of New York, residing temporarily at New Orleans, in the parish of Orleans and State of Louisiana, have invented new and useful Improvements in Processes of Preparing Oils for Edible or other Purposes, of which the following is a specification.

Heretofore in the preparation or manufacture of fats or oils for edible, medicinal, therapeutic, pharmaceutic, culinary, and kindred purposes (and by the term "oil" I include fats, and vice versa) no attempt has been made to prepare or manufacture the same so that the oil should have a predetermined content of olein, palmitin, and stearin—meaning the triglycerids of oleic, palmitic, and stearic acids or an approximation thereto—nor to an approximation of the content of said proximate constituents as found in the human fat.

Edible and kindred oils are not homogeneous chemical compounds, but are mixtures or compositions of various triglycerids of fatty acids in varying proportions not at all approximating the proportions of olein, palmitin, and stearin as found in the human adipose tissue, wherein the oil consumed is mostly finally assimilated. I have discovered that the closer the oil consumed approximates the proportions of olein, palmitin, and stearin as found in the human system the more easily is it digested and the more wholly is it assimilated, and, moreover, when in such proportion the oil is always liquid in the stomach at the temperature of the body—$37\frac{1}{3}°$ centigrade—which facilitates ease of digestion. Moreover, in a medicinal sense as regards any material excess of palmatin and stearin over said proportions in the adipose tissue and as now ordinarily administered or consumed in sundry oils or fats such excess, not being absorbed by the ultimate tissues or cells, continues generally as a heavy useless drag in the circulation or is wasted in excreta or is deposited in abnormal obstructions in sundry glands or in the intestinal tract, especially so after the olein content is absorbed and especially when consumed by invalids or persons of sedentary habits.

By "oils for medicinal use" I include not only oil intended for consumption by itself, but also in lieu of the fixed oils as now commonly used in medicine as a solvent of and vehicle for the carriage of medicines and including the oleates.

Fats and oils in unguents, ointments, liniments, plasters, suppositories, pessaries, &c., being absorbed into the system are more quickly assimilated when their composition approximates the fat of the adipose tissue as regards olein, palmitin, and stearin content.

My invention, which is the result of physiological and chemical investigations, has for its object the production of an oil for edible, medicinal, therapeutic, pharmaceutic, culinary, or other purposes which will be most readily assimilated or absorbed by the human system and which will avoid the abnormal deposit of solid fats and which will entail upon the digestive organs or absorbing tissues little or none of the work incident to the elimination of non-assimilable portions of oils or fats now provided for human consumption; and to this end the invention consists in so treating and compounding oils that the resulting manufactured oil shall comprise olein, palmitin, and stearin in the approximate proportion as found in human fat and with or without minute quantities of other triglycerids of fatty acids, or water, or flavors, or other naturally-occurring ingredients.

The human fat of an adult upon careful analysis was found to contain about 86.21 per cent. of olein, 7.83 per cent. palmitin, and 1.93 per cent. stearin, and the fat of a child was found to contain about 65.04 per cent. olein, 27.81 per cent. palmitin, and 3.15 per cent. stearin. The remainder comprises minute quantities of caproin, myristin, and other triglycerids of fatty acids, some of which are undetermined. Such fats are always liquid during life in the adipose tissue. The said percentages vary somewhat in fats from different minor parts of the body and for different ages.

In some examples of my invention my prepared oil comprises olein, palmitin, and stearin in the proportions aforesaid of adult human fat, and this I term "adult-oil formula." In other examples the proportions of said ingredients are the same as in the fat of a child, and this I term "child-oil formula." It will be understood that other predetermined proportions of the proximate constituents referred to are contemplated to be within the scope of my invention. In the said adult-oil formula the relative proportions of olein, palmitin, and stearin considered without reference to other minor fats are as follows:

$$\frac{86.21}{86.21 + 7.85 + 1.93 = 95.97} = 89.83 \text{ per cent.}$$

olein; $\frac{7.83}{95.97} = 8.16$ per cent. palmitin, and $\frac{1.93}{95.97} = 2.01$ per cent. stearin. In said child-oil formula the analogous relative proportions are $\frac{65.04}{65.04 + 27.81 + 3.15 = 96} = 67.75$ per cent. olein, and $\frac{27.81}{96} = 28.97$ palmitin, and $\frac{3.15}{96} = 3.28$ per cent. stearin.

In treating and preparing a compound oil by my hereinafter-described preferred method if the oils used in compounding contain over four per cent. of fats or natural ingredients other than olein, palmitin, and stearin then in preparing an oil for a child's use I prefer to calculate and compound such weights of the several oils that the olein, palmitin, and stearin of the whole shall have the proportion to each other of about 67.75 to 28.97 to 3.28, respectively, and if the said oils contain four per cent. or under then I prefer to compound such weights of the respective oils that the percentage of olein shall be about 65.04 per cent. of the whole and of palmitin about 27.81 per cent. and of stearin about 3.15 per cent, and likewise in preparing a compound oil for adult use if the oils used contain over 4.03 per cent. of fats or ingredients other than olein, palmitin, and stearin I prefer to calculate and compound such weights that the olein, palmitin, and stearin of the whole shall have the proportion of 89.83 and 8.16 and 2.01, respectively, and if said oils contain 4.03 per cent. or under then I prefer to compound such weights that the percentage of olein shall be about 86.21 per cent. of the whole, and of palmitin 7.85 per cent., and of stearin 1.93 per cent., and so likewise with other oil formulas.

In the practice of my process, first, the oils are expressed or extracted from their native sources by any suitable or well-known method; and, secondly, in some cases I further obtain therefrom by well-known methods, such as by means of heating and cooling and subsidence and crystallization or solidification and cold or hot pressure or filtration or by centrifugal separators, a liquid oil consisting principally of olein, some with a little palmitin or stearin, or both, in solution, also a solid fat consisting principally of palmitin or of stearin, or of both; and, thirdly, I determine or calculate by well-known methods the approximate percentages of olein, palmitin, and stearin in said obtained oil or other oil to be used therewith, and, fourthly, I mix or compound a certain weight of said liquid oil or a native oil with a certain weight of one or more other liquid or solid oils, or both, which when compounded will comprise the said proximate constituents or elements olein, palmitin, and stearin in approximately the percentages or proportions of olein, palmitin, and stearin set forth in the above or other predetermined oil formula.

In order that the compound oil above produced may be readily given the exact predetermined content desired, I may mix therewith the requisite calculated amount of olein, palmitin, or stearin, preferably synthetically prepared. The said certain weights to be compounded are readily calculated by any one skilled in the art of chemical compounding when the proximate constituents of the several oils are first determined.

To carry out my invention by simply compounding the proximate constituents of the oil formula, which I also do, though I do not prefer the same on account of its expense, I first obtain or manufacture the separate proximate elements olein, palmitin, and stearin. I prefer such which have been prepared synthetically by methods well known to chemists and preferably where an edible native oil has been decomposed by the action of water alone when aided by heat and pressure by what is known as the "superheated-steam process," whereby oleic, palmitic, and stearic acids and glycerol are severally obtained in a pure state without the use of chemicals, each acid and glycerol being subsequently combined synthetically by well-known methods to form pure olein or palmitin or stearin, respectively. I compound the said elements in the proportion stated or required by the oil formula by first melting or liquefying the stated amounts or percentages of palmitin and stearin separately at minimum temperature for each—at 64° centigade for palmitin and at about 72° centigrade for stearin—and thereupon adding the same successively to the olein heated to a temperature of about $37\frac{3}{7}°$ centigrade—the human-body temperature—stirring the mixture, preferably maintained at latter temperature, for several hours until homogeneously mixed. Thus to compound one hundred pounds of child-oil formula I heat and mix as above described preferably 67.75 pounds of olein and 28.97 pounds palmitin and 3.28 pounds stearin.

To compound one hundred pounds of adult-oil formula I heat and mix as described preferably 89.83 pounds olein and 8.16 pounds palmitin and 2.01 pounds stearin.

Though this is a very accurate method of compounding the above formulas, yet on account of the expense incidental to manufacturing said proximate constituents and in order to be enabled to sell the improved oil at a moderate price I prefer the preceding first-named method—to wit, to compound native edible oils as now found or expressions therefrom or remnant solid fats left from such expressions as per the formula, giving the preference to those native oils from heathful sources whose principal constituents are olein, palmitin, and stearin.

In all cases the percentage of the proximate constituents will be preferably within the limits, as follows: olein, 65.04 per cent. to 86.21 per cent.; palmitin, 7.83 per cent. to 27.81 per cent., and stearin 1.93 per cent. to 3.15 per cent.; or proportions, olein, 67.75 to 89.83; palmitin, 28.97 to 8.16, and stearin 3.28 to 2.01, respectively.

Considering now the preferred embodiments of my invention, I will now more fully describe the same, premising such description with the statement that by "native" oil I mean any oil from edible animal or vegetable or from any suitable source, including fruits, nuts, and seeds, as obtained from its native state by the methods and in the form now commonly or commercially used or known or by any other suitable method.

I prefer to extract the native oils for use in the preferred embodiments of my invention from animal fats by cold pressure and from vegetable sources by a combination of pressing and extracting—first, cold hydraulic pressing of oils, and, second, grinding and extracting from the cakes with solvents.

In the extraction of the fats from their native sources where heat is employed I use the lowest temperature practicable, preferably not exceeding 37° to 49° centigrade, until all nitrogenous matter is separated, and I prefer the process of dry fusion with water-bath apparatus. I purify the expressed or extracted fat to remove any suspended impurities by subsidence and in some cases by filtration through animal charcoal. I remove obnoxious odors and foreign non-saponifiable substances when practicable at low cost and also free acids and resin, where such be present, and otherwise refine and purify by present well-known or suitable methods. In compounding by this method, especially in using proportions, I prefer to use such native oils or fats wherever practicable, as appear in examples Nos. 1 and 6 hereinafter given, without expressing or extracting therefrom any solid fats or only a minor portion thereof; but in many cases I express most of the solid fats, palmitin or stearin, or both, where such removal facilitates the process.

When the fat or oil for use in my process abounds in stearin—as, for instance, caul-fat or oleo-oil—I remove the maximum amount possible of the solid fats therefrom, preferably by melting and permitting the same to settle and remain quiescent several days—preferably three days—at a low temperature, preferably about 21° centigrade, whereupon a large percentage of palmitin and stearin and other solid fats will solidify or crystallize. Then by filtration or by pressure in cloths, preferably using hydraulic press with gradually-increasing pressure or other suitable separating device, I press or strain out the liquid oil, preferably at a temperature of about 21° centigrade, and which liquid oil contains little stearin and palmitin in solution, and this operation I repeat once, twice, or oftener, preferably at a temperature of about 5° to 2° centigrade, (at least 1° or 2° above freezing-point of olein,) until the amount of stearin in solution in the liquid oil shall be such as may be desired for any particular oil formula or such as is estimated at or ascertained to be very low, preferably between 1.93 and 3.15 per cent.; but I do not restrict myself to the latter percentages. Such I call a "destearinized olein base," which term includes, among other destearinized olein bases, beef destearinized olein and oil of lard destearinized. (Referred to in examples hereinafter cited.)

In the employment of some native oils, which especially abound in palmitin and which contain little or no stearin and wherein the ratio of palmitin to olein exceeds that required by the adult-oil formula being compounded—for instance, some olive-oils—in lieu of the foregoing step of destearinizing I in some cases remove the excess of palmitin by subjecting the oil to a temperature preferably at first operation about 11° centigrade and thereafter preferably 5° to 2° centigrade for several hours or days in a quiescent state and which causes a large percentage—in amount depending on the degree of cold and time allowed—of the palmitin to crystallize and solidify and which solid fat can then by filtration or pressure methods be readily removed, and the resulting oil pressed or filtered therefrom will consist principally of olein with a materially-diminished amount of palmitin in solution, and this process can, if necessary, be repeated one or more times until the olein will have such an approximate amount of palmitin in solution as may be desired for any particular oil formula. Such an oil I call a "depalmitinized oil" or "olein base," and the solid palmitin thus obtained can be used in other compounds. In some cases the solid palmitin may have some small percentages of olein, which has been caught in the crystals on solidifying.

The methods and temperatures known or found to be best adapted to the particular oil or fat under treatment for the separation of the liquid from the solid portion thereof are employed.

When the solid fat is extracted—for instance, by hydraulic pressure—in the above-described manner from caul-fat, the said solid fat is sometimes used in very small amount in compounding, as hereinafter described. It consists of about equal parts of palmitin and stearin, with probably a very little olein, which has been caught by the crystals in solidifying. One such solid fat shown in my examples contained fifty-four per cent. palmitin and forty-six per cent. stearin. This solid fat may be further modified by extracting a material amount of stearin, or it may be approximately separated into its palmitin and stearin constituents for use separately or together with the olein base when desired. To effect this separation, the process above set forth employed for destearinizing is repeated at much higher temperature. Thus I melt the solid fat at a temperature of about 65° centigrade or above. I thereupon permit the melted fat to remain quiescent, preferably three days, at a temperature of about 65° centigrade, whereupon the stearin will in a great measure crystallize and solidify, the palmitin being mostly still liquid, together with any olein which may be present. Some stearin will remain in solution in this liquid. I then extract the solidified stearin by hydraulic pressure or filtration at a temperature of about 65° centigrade. The liquid fat thus expressed as a liquid at high temperature solidifies at ordinary temperature and consists, as above implied, almost wholly of palmitin, with very little stearin. By repeating this operation once or oftener I obtain a fat consisting approximately of palmitin, which I may employ as a palmitin, and also a separate fat consisting approximately of stearin, which I may employ as a stearin base, in compounding my improved oil.

An approximately pure stearin may also be obtained from the solid fat from lard or suet and from which all olein has been expressed by treating the solid fat with cold ether as long as anything is dissolved. The palmitin is thus taken up and stearin remains.

An approximately pure palmitin may also be obtained by cold pressure from olive-oil solidified at from 5° to 2° centigrade.

An approximate olein can also be obtained by repeatedly destearinizing and depalmitinizing lard-oil or olive-oil or cyperus-grass-root oil and other oils in the manner above described.

Having determined the approximate composition of the olein base and of the other materials to be employed and then calculated from such determination the amounts of the several oils to be used, I thereupon melt each of the same at the lowest possible temperature and heat the olein base or principal liquid oil to a temperature not exceeding $37\frac{7}{8}°$ centigrade, and thereupon in any suitable apparatus or vessel, preferably a water-bath arrangement, I pour the other melted oils selected to modify the composition of the principal olein base successively into said olein base, stirring the same for several hours and in some cases for days with any suitable mechanical device, so as to effect thorough commingling of the proximate constituents of the several oils, the mixture and apparatus being maintained at about $37\frac{7}{8}°$ centigrade. Thereafter the compound should preferably be passed to an artificial cooler, wherein it will be quickly chilled, or in some cases sprayed into ice-cold water to give the product a granular appearance and then be placed in convenient-sized packages for market, preferably in opaque glass or queensware or in hermetically-sealed tins or otherwise where same will be protected from air and light and moisture, and preferably wherein the contents can be thoroughly sterilized after sealing, preferably at a temperature of 115.5° centigrade.

Among the native oils obtained or prepared as aforesaid I prefer to use those named in the following examples, though I do not restrict myself thereto, but can compound with any other oils or fats, being governed by the commercial value and the availability of any edible oils from any source and the relative known healthfulness of such source and the relative absence of deleterious matters, including such as the following: marrow-fat, goose-fat, duck-fat, chicken-fat, cow-butter, hog-back lard, sawarra-fat, (butternut,) hazel-nut oil, beech-nut oil, mafurra-tallow, Chinese vegetable tallow, Japan wax, maize-oil, cyperus-oil, sesame-oil, cameline-oil, cocoa-butter, vegetable tallow, seal-oil, cod-liver oil, neat's-foot oil.

I prefer to avoid those native oils, such as palm-oil, which decompose spontaneously into fatty acids and glycerins, though such can be used for immediate consumption.

In stating the amounts of olein, palmitin, and stearin of the various oils named in these examples I am aware of the fact that the said percentages constantly vary in the same character or kind of oil even from the same species. Each lot should accordingly be approximately analyzed before using. Any other pro rata unit can be used in place of the pound, such as grams or ounces.

In the following examples the proportions of olein, palmitin, and stearin only are considered, the other fats or non-saponifiable content thereof being omitted.

Example No. 1: To compound an oil approximating the child-oil formula, I compound, as aforesaid

|  | Olein. | Palmitin. | Stearin. |
|---|---|---|---|
| 100 lbs. olive-oil, comprising | 67 lbs. | + 25 lbs. | + 0 |
| 15 lbs. beef oleo, double-pressed | 7½ lbs. | + 4.05 lbs. | + 3.45 lbs. |
| 115 lbs. total, comprising | 74.5 lbs. | + 29.05 lbs. | + 3.45 = 107 |
| Equals percentages, about | 65% | + 26% | + 3% |
| Equals proportions, about | 68.6 | 27.16 | 3.20 |

The above beef oleo is what is commercially known as the "double-pressed oleo-oil," which generally comprises fifty per cent. olein, twenty-five per cent. palmitin, and twenty-five per cent. stearin. In that which I used the ratio of palmitin to stearin was twenty-seven to twenty-three.

Example No. 2: To compound an oil containing olein, palmitin, and stearin in the proportion of child-oil formula, I mix olive-oil and double-pressed oleo, as in Example No. 1, and add thereto four pounds of palmitin obtained from olive-oil or a pro rata amount of other palmitin, such as vegetable tallow, from the solid fat surrounding the kernel of seed from stillingia sebifera, thus—

|  | Olein. | Palmitin. | Stearin. |
|---|---|---|---|
| 100 lbs. olive-oil, comprising | 67 lbs. | +25 lbs. | +0 |
| 3.3 lbs olive-oil palmitin or vegetable tallow | .3 lbs. | + 3 lbs. | +0 |
| 15 lbs. double-pressed beef oleo | 7.5 lbs | + 4.05 lbs. | +3.45+ |
| 118.3 lbs. total, comprising | 74.8 lbs. | +32.05 lbs. | +3.45=110.3 |
| Equals proportions | 67.81 | 29.05 | 3.12 |

Example No. 3: To compound an oil approximating child-oil formula, I mix

|  | Olein. | Palmitin. | Stearin. |
|---|---|---|---|
| 100 lbs. olive-oil, No. 2 | 70 lbs. | +25 lbs. | +0 |
| 15 lbs. double-pressed beef oleo | 7.5 lbs. | + 4.05 lbs. | +3.45 lbs. |
| 5 lbs. cotton-seed palmitin | .5 lbs. | + 4.58 lbs. | + .165 lbs. |
| 120 lbs. total, comprising | 78 lbs. | +33.60 lbs. | +3.615=115.2 |
| Equals percentages | 65% | +28% | +3.01% |
| Equals proportions | 67.72 | 29.16 | 3.14 |

The olive-oil used herein contained a higher percentage of olein than that in Example No. 1. The cotton-seed palmitin herein used was what is known as "cotton-seed stearin," being the solid fat deposited from refined winter cotton-seed oil and from which the liquid-oil content has been further removed by cold and quiescence and pressure or filtration.

Example No. 4: To compound an oil approximating the adult-oil formula, I mix olive-oil from which about five pounds palmitin has been extracted from one hundred pounds olive-oil, as above described, and which I call "olive-oil depalmitinized, No. 1," as follows:

|  | Olein. | Palmitin. | Stearin. |
|---|---|---|---|
| 95 lbs. olive-oil depalmitinized, No. 1 | 66 lbs. | +20 lbs. | +0 |
| 250 lbs. beef destearinized olein, No. 2 | 235 lbs. | + 6.75 lbs. | +5.75 lbs. |
| 5 lbs. beef oleo, D. P. | 2.5 lbs. | + 1.35 lbs. | +1.15 lbs. |
| 350 lbs. total, comprising | 303.5 lbs. | +28.10 lbs. | +6.90=338.5 |
| Equals percentages of whole | 86.71% | + 8% | +1.97% |
| Equals proportions | 89.66 | 8.3 | 2.04 |

Example No. 5: To compound an oil approximating the adult-oil formula, I mix olive-oil from which about ten pounds palmitin has been extracted from one hundred pounds olive-oil and which I call "olive-oil depalmitinized, No. 2:"

|  | Olein. | Palmitin. | Stearin. |
|---|---|---|---|
| 90 lbs olive-oil depalmitinized, No. 2 | 66 lbs. | +15 lbs. | +0 |
| 200 lbs. oil of lard destearinized. | 188 lbs. | + 6.50 lbs. | +3.50 lbs. |
| 10 lbs. beef oleo, D. P. | 5 lbs. | + 2.70 lbs. | +2.30 lbs. |
| 300 lbs. total, comprising | 259 lbs. | +24.20 lbs. | +5.90 lbs.=289 |
| Equals percentages of whole | 86.3% | + 8% | +1.93% |
| Equals proportions | 89.6 | 8.37 | 2.007 |

Example No. 6: To compound an oil approximating the child-oil formula, using three commercial oils, I mix

|  | Olein. | Palmitin. | Stearin. |
|---|---|---|---|
| 90 lbs. olive-oil, comprising | 58.3 lbs. | + 22.50 lbs. | +0 |
| 11 lbs. double-pressed oleo, comprising | 5.5 lbs. | + 2.97 lbs. | +2.53 lbs. |
| 20 lbs. cotton-seed oil, comprising | 6 lbs. | + 3 6 lbs. | + .66 lbs. |
| 121 lbs. total, comprising (102=) | 69.8 lbs. | + 29.07 lbs. | + 3.19 |
| Equals proportions | 68.43 | 28.5 | 3.127 |

Example No. 7: To compound an oil approximating adult-oil formula, I mix as follows:

|  | Olein. | Palmitin. | Stearin. |
|---|---|---|---|
| 90 lbs. hog-lard oil, contents = | 84.6 lbs. | 2.925 lbs. | 1.575 lbs. |
| 4 lbs. hog-back lard = | 3 lbs. | .608+lbs. | .332 lbs. |
| 5 lbs. Japan wax or olive-oil palmitin = | .3+ lbs. | 4.6 lbs. | 0 |
| 99 lbs. total = | 87.90 lbs. | 8 133 lbs. | +1.907=97.94 |
| Equals proportions | 89.75 | 8.30 | 1.94 |
| Equals percentages | 88.7 + | 8.2 + | 1.92 |

With some lard-oils which contain more olein and less palmitin and stearin than the above the above lard may be omitted. I also sometimes use cotton-seed palmitin in place of above palmitin.

Example No. 8: To compound an oil approximating percentages of child-oil formula, I compound as follows:

|  | Olein. | Palmitin. | Stearin. |
|---|---|---|---|
| 140 lbs. hog-lard oil, contents = | 126 lbs. | 8.96 lbs. | 4.84 lbs. |
| 10 lbs. hog-lard, neutral = | 6.7 lbs. | 2.2 lbs. | 1.1 lbs. |
| 50 lbs. Japan wax or olive-oil palmitin = | 3 lbs. | 46 lbs. |  |
| 200 lbs. total = | 135.7 lbs. | +57.16 lbs. | +5.94=198.80 |
| Equals percentages | 65 | 28 | 3— |

Example No. 9: To compound an oil approximating the adult-oil formula, I mix

|  | Olein. | Palmitin. | Stearin. |
|---|---|---|---|
| 60 lbs. beef olein base, No. 1 | 57 lbs. | +1.62 lbs. | + 1.38 lbs. |
| 10 lbs. cow-butter | 3.4 lbs. | 4.05 lbs. | .19 lbs. |
| 70 lbs. total | 60.4 lbs. | + 5.67 lbs. | +1.57=67.64 |
| Equals percentages | 86.3% | + 8% | + 2.2% |
| Equals proportions | 89.44 | 8.38 | 2 32 |

Example No. 10: To compound an oil approximating the proportions of adult-oil formula, I mix

|  | Olein. | Palmitin. | Stearin. |
|---|---|---|---|
| 102 lbs. sweet almond-oil, comprising | 89.57 lbs. | + 6.12 lbs. | +0 |
| 4 lbs. oleo beef stearin | | 2 lbs. | 2 lbs. |
| 106 lbs. total, comprising | 89.57 lbs. | + 8.12 lbs. | + 2 = 99.69 |
| Equals proportions | 89.57 | 8.12 | 2 |

Example No. 11: To compound an oil approximating the proportions of child-oil formula, I mix

|  | Olein. | Palmitin. | Stearin. |
|---|---|---|---|
| 124 lbs. oil sweet almonds, comprising | 108.90 lbs. | + 7.44 lbs. | + 0 |
| 43 lbs. neutral lard | 25.16 lbs. | +11.4 lbs. | + 6.45 lbs. |
| 41 lbs. vegetable tallow or olive palmitin | 1.64 lbs. | 38.95 lbs. | 0 |
| 208 lbs. total, comprising | 135.67 lbs. | +57.79 lbs. | + 6.45 lbs. |
| Equals proportions | 67.83 | 28.89 | 3.22 |

Example No. 12: To compound an oil approximating the proportions of child-oil formula, I mix

|  | Olein. | Palmitin. | Stearin. |
|---|---|---|---|
| 100 lbs sweet almond-oil, comprising | 87.82 lbs. | + 6 lbs. | +0 |
| 100 lbs. cow-butter | 34 lbs. | 40.50 lbs. | 1.91 |
| 10 lbs. double-pressed oleo | 10 lbs. | 5.4 lbs. | 4.6 |
| 6.6 lbs. olive-oil palmitin | .3 to .6 | 6 | 0 |
| 216.6 lbs. total, comprising | 132.42 lbs. | +57.9 lbs. | 6.51=196.8 |
| Equals proportions | 66.21 | 28.95 | 3.25 |

Example No. 13: To compound an oil approximating the adult-oil formula, I mix

|  | Olein. | Palmitin. | Stearin. |
|---|---|---|---|
| 200 lbs. oil back-lard destearinized, comprising | 192 lbs. + | 5 lbs. + | 2.8 lbs. |
| 4 lbs. stearin from above lard | | 2.5 lbs. + | 1.4 lbs. |
| 10 lbs. olive-oil palmitin | .4 lbs. + | 8.6 lbs. + | 0 |
| 214 lbs. total, comprising | 192.4 lbs. + | 16.1 lbs. + | 4.2 = 212.7 |
| Equals percentages | 89+% | 8—% | + 2—% |

It is often an advantage, especially in this and following example, to have the small excess of olein shown, and especially so where cotton-seed palmitin or other palmitin is substituted for olive-oil palmitin.

Example No. 14: To compound an oil approximating the adult-oil formula, I mix

|  | Olein. | Palmitin. | Stearin. |
|---|---|---|---|
| 100 lbs. oil of beef-caul fat destearinized, comprising | 95 lbs. + | 2 lbs. + | 2 lbs. |
| 7½ lbs. olive-oil palmitin | .3 lbs. + | 6.5 lbs. + | 0 |
| 107½ lbs. total, comprising | 95.3 lbs. + | 8.5 lbs. + | 2 lbs. |
| Equals percentages | 88+% | 8—% | + 2—% |

Any of the above examples are made of the exact percentages or proportions by the additions of requisite amounts of the proximate constituents obtained as above described.

In order to prepare the above improved oils at lowest possible cost, I prefer to use the destearinized oil of lard as the base or source of my olein; but for those preferring vegetable oils I prefer olive-oil or almond-oil therefor. Where additional palmitin is required, I prefer such, first, as expressed from olive-oil and, second, from cotton-seed. Where both palmitin and stearin are to be added, I prefer such expressed, first, from beef-caul fat, and, secondly, from cotton-seed stearin.

I do not restrict myself to compound as above, so as to attain or compound only the said percentages of olein, palmitin, and stearin. The compound may comprise other minor fatty acids or glycerids thereof, or flavoring or aromatic matters or water or other natural ingredients found in the native source from which the oil used was extracted.

The oils made by these improved processes also have analogous and superior advantages for soap-making, not only to form or constitute the fatty acids thereof, but also as the additional fat or oils added to soap for the manufacture of superfatted soaps. The same are also useful for other technical purposes, such as a lubricant, and for wool-oils and cloth-oils.

I use the term "modified oil" to indicate any of the above native oils from which stearin or palmitin has been abstracted in whole or in part or to which such has been added, and I also include thereby either the liquid expressed or filtered oil or the residual solid oil.

I am aware that natural fats have heretofore been compounded—as, for instance, to manufacture oleomargarin, butterin, compound lard, cottolin, and also for adulteration purposes—and I do not claim invention of any such; but in none such has the object been to obtain a predetermined formula, as above described.

In another application for patent, filed by me January 15, 1903, Serial No. 139,200, I specifically claim various oils, and therefore do not claim same herein, though they can be preferably made by the processes herein described.

What I claim as my invention, and desire to secure by Letters Patent, is—

1. The process herein described, of producing from native fats or oils, an oil analogizing human fat as regards its olein, palmitin and stearin content, which consists in removing from said fat or oil a portion thereof, consisting approximately of solid fat, determining the composition of the residue as regards its olein, palmitin and stearin content, determining the composition of fat or fats to be compounded therewith as regards the olein, palmitin and stearin content, and adding to said residue sufficient of the last-mentioned fat or fats to bring said ingredients into a predetermined percentage or proportion, substantially the same as that in which they occur in human fat.

2. The process herein described, of producing from animal or vegetable fats or oils, an oil analogizing human fat as regards its olein, palmitin and stearin content, which consists in removing from said native fat or oils such portion thereof, consisting approximately of solid fat, that the stearin and palmitin content of the residue shall not exceed the proportion of these proximate elements in human fat, determining the composition of the residue as regards its olein, palmitin and stearin content, determining the composition of fat or fats to be compounded therewith as regards the olein, palmitin and stearin content, and adding to said residue sufficient of the last-mentioned fat or fats to bring said ingredients into a predetermined percentage or proportion, substantially the same as that in which they occur in human fat.

3. In the art of treating and preparing oils for edible and other purposes, the method of increasing the digestibility and assimilability thereof, which consists in separating the same into approximately its solid and liquid constituents, and then in determining approximately the percentages of olein, palmitin and stearin of the resulting liquid and solid fats or oils, and also in fats or oils to be used therewith and thereupon from the same compounding an oil which comprises olein, palmitin and stearin in the approximate percentages or proportions of said proximate constituents in a predetermined oil formula analogizing human fat, substantially as described.

4. The process herein described of treating fats or oils to give the same a predetermined content of olein, palmitin and stearin, consisting first in eliminating from native fats or oils a portion thereof, said portion consisting approximately of solid fats, subjecting the same to a series of separating steps at different temperatures; determining the composition of the liquid residue; and, finally, modifying said residue by the addition of fat or oil of predetermined composition requisite to bring the resulting oil to the predetermined content of said proximate constituents.

5. The process herein described of treating fats or oils to give the same a predetermined content of olein, palmitin and stearin, consisting in removing solid fat mostly, therefrom by first melting the fat and permitting the heavier fat to solidify and subside; then separating the liquid and solidified portions from each other; then subjecting said liquid portion to a further separating step at a temperature lower than the preceding, whereby a considerable part of palmitin and stearin are further separated from the olein; determining the compositions of the resulting liquid portion and of solid fats to be used therewith, and finally compounding from the same an oil having a predetermined content of olein, palmitin and stearin analogizing that of human fat.

6. The process herein described of treating fats or oils to give the same a predetermined content of olein, palmitin and stearin, consisting in removing solid fat therefrom by first melting the fat, then permitting the same to remain in a quiescent state and under a low temperature until a portion solidifies, then separating the solidified and liquid portions from each other, then subjecting the liquid portion to a plurality of pressure and straining operations at different temperatures, whereby a considerable part of palmitin and stearin are separated from the olein; then determining the composition of the resulting liquid, and finally modifying the same by the addition of fat or oil of predetermined composition requisite to bring the resulting oil to a predetermined content analogizing the olein, palmitin and stearin content of human fat.

7. The herein-described process of treating fats or oils to give the same a predetermined content of olein, palmitin and stearin, which consists in melting native fats, preferably at or about $37\frac{1}{3}°$ centigrade; allowing the same to remain in a quiescent state at a lower temperature, preferably about $21°$ centigrade, until solid fat has largely solidified; separating the liquid portion from the solid portion by cold pressure at or about $21°$ centigrade; repeating this separating step at a lower temperature, preferably about $5°$ to $2°$ centigrade, until the extracted liquid shall contain, preferably approximately not more than 3.15 per cent. of stearin, determining the olein, palmitin and stearin content of said liquid and adding thereto such an amount of fat of a predetermined composition as is requisite to bring the composition of said liquid up to a predetermined content of olein, palmitin and stearin analogizing that of human fat.

8. The process herein described of producing from animal or vegetable fats or oils, an oil analogizing human fat as regards its olein, palmitin and stearin content, which consists in removing from native fats or oils a portion thereof consisting approximately of solid fat; determining the composition of the residue as regards its olein, palmitin and stearin content; determining the composition of fat or oils to be compounded therewith as regards the olein, palmitin and stearin content; then compounding said residue with sufficient of said last-mentioned fat or oils to give the compound a predetermined content of olein, palmitin and stearin, by melting said fats at the lowest possible temperature, heating the liquid residue to a temperature, preferably not exceeding $37\frac{1}{3}°$ centigrade, and mixing the other melted fat therewith, said mixture being stirred at a temperature of about $37\frac{1}{3}°$ centigrade until the constituents are thoroughly commingled.

9. The process herein described of producing from animal or vegetable fats or oils, an oil analogizing human fat as regards its olein, palmitin and stearin content, which consists in removing from native fats or oils, comprising olein, palmitin and stearin, a portion thereof consisting approximately of solid fats; determining the composition of the residue as regards its olein, palmitin and stearin content and that of the said removed solid fat, and adding to the said liquid residue sufficient of the last-mentioned fats to constitute an oil having a predetermined content desired.

10. The herein-described process of treating fats or oils to give the same a predetermined content of olein, palmitin and stearin, consisting in, first, approximately separating the fat or oil into the liquid and solid fats at ordinary temperature, analyzing the several separated portions and compounding them as requisite to give a predetermined content of olein, palmitin and stearin analogizing that of human fat.

11. In the process of producing from animal or vegetable fats or oils, an oil analogizing human fat, the step of changing the proportions in which the olein, palmitin and stearin exist in a material employed, the content of which as regards said ingredients has been previously determined, to an extent requisite to bring said ingredients into a predetermined percentage or proportion approximately the same as that in which these proximate constituents occur in human fat.

12. In the process of treating fats or oils to give the same a predetermined content of olein, palmitin and stearin analogizing human fat, the step of compounding together a liquid fat, consisting principally of olein, a solid fat consisting principally of palmitin and a solid fat having a higher melting-point than the foregoing palmitin and consisting principally of stearin in the proportions of 65.04 to 86.21 per cent. of the first-mentioned fat, and 3.15 to 1.93 per cent. respectively of the last-mentioned fat, the second-mentioned fat constituting approximately the balance.

13. The process for producing from natural animal or vegetable fats or oils an oil analogizing human fat as regards its olein, palmitin and stearin content, to increase its assimilability, which consists in first determining the approximate composition of each material to be employed as regards olein, palmitin and stearin content, then changing the proportions in which the said proximate principles exist in the same to an extent requisite to bring the olein, palmitin and stearin content of the oil compounded of said material or materials, into a predetermined percentage or proportion, such latter being substantially the same as that in which these constituents occur in human fat.

14. The process herein described of treating native animal and vegetable fats or oils to give the same a predetermined content of olein, palmitin and stearin, consisting in purifying the same; approximately separating the solid fats from the liquid fat; determining the composition of the liquid fat; and mixing with said liquid fat sufficient of a fat or oils of a known content, whereby the resulting composition will have a predetermined content of olein, palmitin and stearin substantially the same as that of human fat.

In testimony whereof I have signed my name to this specification in the presence of two subscribing witnesses.

JACOB E. BLOOM.

Witnesses:
  JOHN A. JACKSON,
  WESLEY LESTER.